Aug. 11, 1964  J. S. TJADEN  3,144,047
SOLENOID OPERATED VALVE
Filed Dec. 19, 1961  2 Sheets-Sheet 1

INVENTOR.
JAMES S. TJADEN
BY
ATTORNEYS

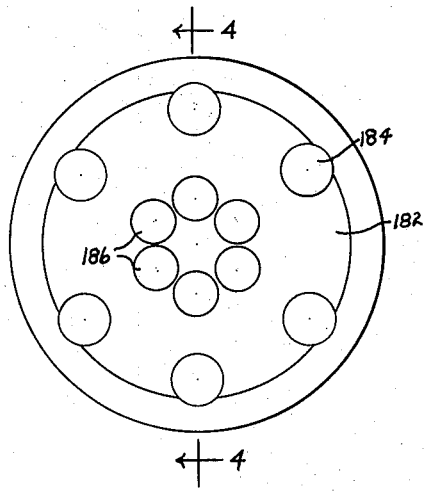
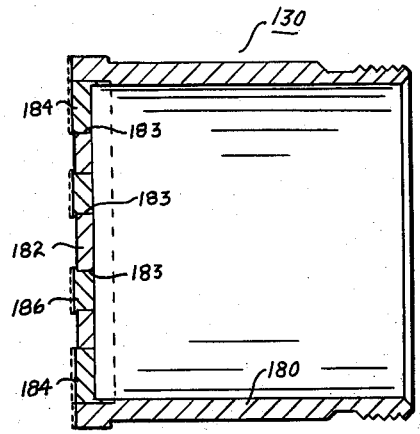
FIG. 3  FIG. 4
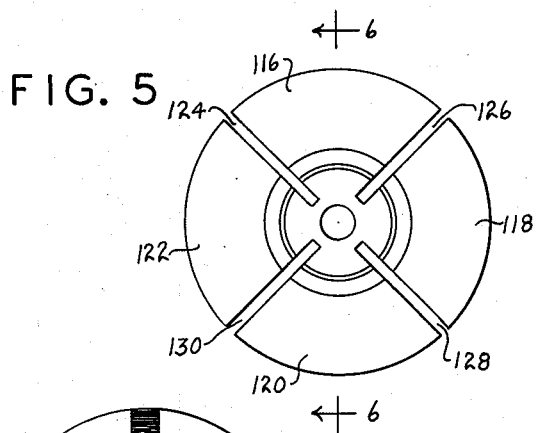
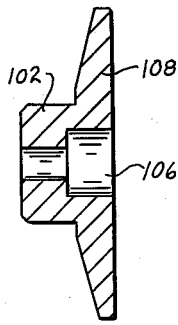
FIG. 5
FIG. 6
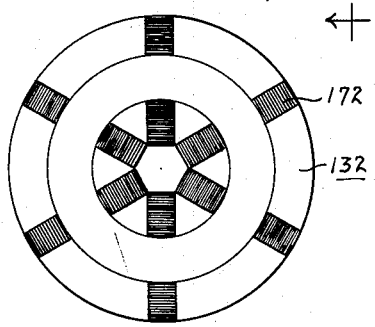
FIG. 7
INVENTOR.
JAMES S. TJADEN
ATTORNEYS

United States Patent Office 3,144,047
Patented Aug. 11, 1964

3,144,047
SOLENOID OPERATED VALVE
James S. Tjaden, Vandalia, Mich., assignor to Koontz-Wagner Electric Company, Inc., South Bend, Ind., a corporation of Indiana
Filed Dec. 19, 1961, Ser. No. 160,535
8 Claims. (Cl. 137—625.48)

The present invention relates to solenoids and more particularly to a solenoid construction designed primarily for operating fluid control devices such as valves, regulators and the like.

Solenoid valves are extensively used to control the flow of a large variety of different kinds of fluids, including hydraulic, air and other gases, highly inflammable and readily volatile liquid and gaseous fuels, and water containing many different types of chemicals in solutions, often of a highly corrosive nature. In the conventional solenoid valves, the valve element is usually operated by a plunger reciprocating in the electric coil and connected directly to the valve element by a stem or shaft extending through the valve housing into the fluid chamber of the valve. This conventional construction presents a persistent problem of sealing the electromagnet coil from the fluid chamber to prevent the fluid passing through the valve from leaking around the stem and entering the coil and coil housing where it may react with the material forming the coil, resulting in serious damage and/or complete failure of the coil, or it may create a dangerous fire or explosive condition in or around the solenoid valve unit. Various types of seals and special intermediate chambers have been tried and often extensively used; however, these constructions almost invariably fail in time, thereby creating any one of the aforementioned hazardous conditions unless the failure is promptly discovered and corrected. It is therefore one of the principal objects of the present invention to provide an electromagnetically operated valve in which the electric coil is permanently and totally sealed from the valve element and fluid chamber by a metal shield or shell substantially enclosing or encasing the coil and in which the electric coil functions effectively to capacity to operate the valve element.

Another primary object is to provide a solenoid enclosed in a cup-shaped container which effectively protects the electric coil, yet which affords a good magnetic circuit for performing the desired operation.

Another object of the invention is to provide a solenoid valve in which the electromagnetic coil is positively sealed from the valve element with no opening of any kind between the fluid passages of the valve and the chamber or housing in which the coil is located.

Still another object of the invention is to provide a solenoid valve having the housing separated into independent fluid chamber and coil sections so constructed and arranged that the two sections can easily and readily be separated from one another for replacement of one of the sections or for repair to the entire valve assembly.

A further object is to provide a valve of the aforesaid type in which a special construction is provided for transmitting the magnetic current from the coil to the armature operating the valve element while maintaining an effective seal between the two elements and which can be readily adapted to various types of valves with very little alteration being required in the construction to obtain satisfactory or optimum performance of the electromagnet.

Another object of the invention is to provide a solenoid valve having a reliable and relatively simple construction for effectively sealing the solenoid from the fluid passages and chamber, and the parts of which can be readily fabricated and easily assembled with standard equipment and tools, and can thereafter be properly serviced without any special skills or training on the part of the operator.

Another object is to provide a solenoid having at one end thereof a protective shield which, while giving good protection to the electric coil, does not interfere with the effective operation of the solenoid.

Additional objects and advantages of the invention will become apparent from the following description and accompanying drawings, wherein:

FIGURE 3 is an end elevational view of the shell in which the solenoid of the valve is enclosed;

FIGURE 4 is a vertical cross sectional view of the shell shown in FIGURE 3, taken on line 4—4 of the latter figure;

FIGURE 5 is an elevational view of the armature used in conjunction with the solenoid of the valve, adapted to operate the valve element, showing the armature disassembled from the valve unit;

Figure 2:
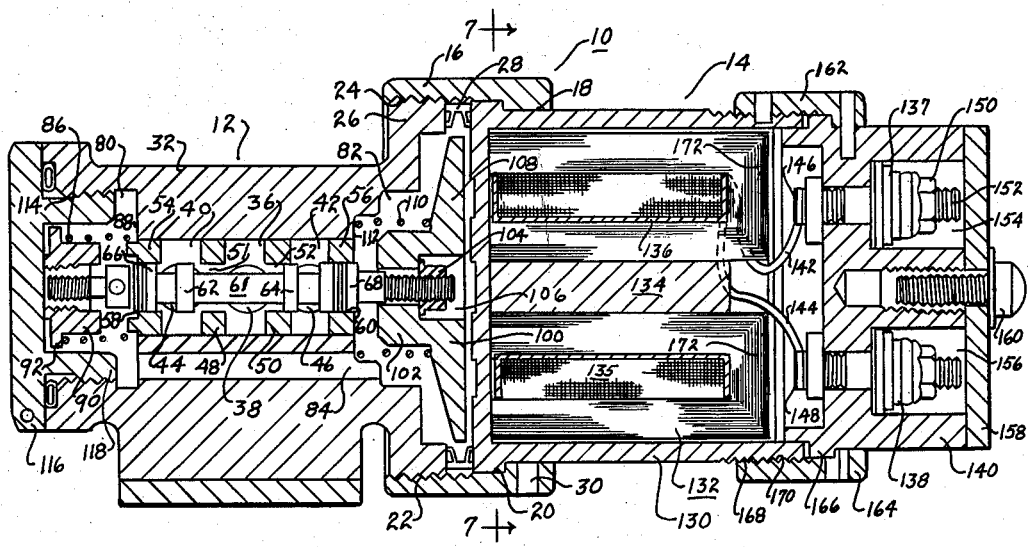
FIGURE 2 is a vertical cross sectional view of the solenoid valve shown in FIGURE 1, taken on line 2—2 of the latter figure.
Figure 1:
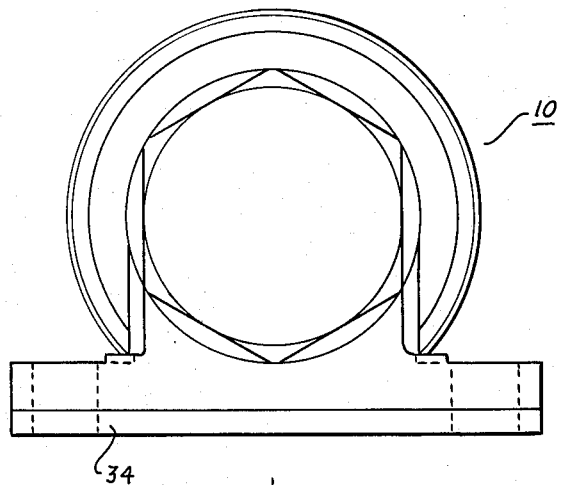
FIGURE 1 is an end elevational view of a solenoid valve embodying the present invention.

FIGURE 6 is a vertical cross sectional view of the armature shown in FIGURE 5, taken on line 6—6 of the latter figure; and FIGURE 7 is a cross sectional view of the solenoid used in the valve shown in FIGURES 1 and 2, the section being taken on line 7—7 of FIGURE 2.

Referring more specifically to the drawings and to FIGURES 1 and 2 in particular, numeral 10 designates generally the solenoid valve having the present invention incorporated therein, and consisting generally of a valve section 12 and an electromagnetic section 14, the two sections being joined together by an internally threaded ring 16 having an inwardly extending flange 18 for engaging radial rib 20 on section 14, and at the other end, screw threads 22 for engaging screw threads 24 on outwardly extending flange portion 26 of section 12. The two sections are maintained in fluid-tight relationship by a suitable gasket such as that shown at numeral 28, interposed between the two sections and adjacent the internal wall of ring 16. The ring is preferably held in fixed position after the two sections have been assembled and the ring tightened by a set screw 30 extending through flange 18 and engaging the external surface of section 14. The type of valve incorporated in the solenoid operated valve, as far as the present invention is concerned, is not important, the one shown being a three-way valve, which for the purpose of the present description may be considered conventional in construction and operation.

Valve section 12 consists of a housing 32, mounted on a base 34 and containing an inlet chamber 36 communicating with inlet passage 38 and two outlet chambers 40 and 42, communicating with outlet passages 44 and 46, respectively. Chambers 40 and 42 are separated from chamber 36 by annular walls 48 and 50, respectively, containing ports 51 and 52. The main valve chamber is sealed on either side of chambers 40 and 42 by annular walls 54 and 56, having openings 58 and 60, respectively, therethrough and in axial alignment with ports 51 and 52. The flow of fluid from inlet chamber 36 to chambers 40 and 42 and outlet passages 44 and 46 is controlled by a spool valve element 61 having lands 62 and 64 for controlling the flow of fluid through ports 51 and 52, respectively. The element also includes sealing lands 66 and 68 for preventing the fluid in chambers 40 and 42 from flowing longitudinally along the spool valve toward the ends thereof. In order to balance the valve element 61 chambers 80 and 82 at the left and right hand ends of the valve element, as viewed in FIGURE 2, connected by passage 84, are included to provide the same pressures on the external ends of lands 66 and 68 to thereby eliminate the effect of any leakage of fluid past one of the two sealing lands. The valve element is urged in the left-hand direction to connect chambers 36 and 40 by a spring 86 reacting at one end against the stationary wall 88 of chamber 80 and at the other end against cap 90, threadedly received on the end of element 61, and having a flange 92 thereon for receiving the adjacent end of spring 86. Threadedly secured to the opposite end of element 61 is an armature 100 having a cylindrical hub portion 102 seated on the end of the element and secured rigidly in place by a nut 104, threadedly secured to the end of the element and seating against the armature in recess 106. The armature has an enlarged flattened portion 108 occupying most of the area in chamber 82 and forming a seat for one end of a spring 110, which reacts between the armature and the fixed wall 112 of chamber 82. The valve chamber has an opening 114 at the end thereof to permit the valve element and springs to be inserted therein, the opening being closed by a cap 116 having an inwardly projecting center portion 118, threadedly secured to the internal wall of the opening.

The details of the armature are more clearly shown in FIGURES 5 and 6, consisting of the hub portion 102, recess 106 and enlarged flattened portion 108, the flattened portion being divided into four sections 116, 118, 120 and 122 by radial slots 124, 126, 128 and 130. These permit the fluid which may be present in chamber 82 to flow readily from one surface of the armature to the other as it is moved to and fro by the solenoid in section 14. The armature is preferably constructed of a single piece of magnetic attractable material, such as soft iron.

Section 14 which houses the electromagnet consists of a cup-shaped shell 130 in which electromagnet 132 is enclosed and secured in place by a suitable potting compound 134. The magnet consists of a wire coil 135 wound on bobbin 136 and connected to contacts 137 and 138 in cap 140 by wires 142 and 144, extending from the magnet and being joined to contacts 137 and 138 at inner ends 146 and 148 by soldering or any other suitable means for creating a satisfactory electrical connection. Lead wires extend through the walls of cap 140 and are secured to the contacts by nuts 150, threadedly received on ends 152 of each contact. The contacts are seated in recesses 154 and 156 of the cap, and are enclosed therein by a plate 158, held firmly in place on the cap by a screw 160, extending through the plate and being threadedly received in the cap. The cap is secured to shell 130 by a ring 162, having an internally extending flange 164 for engaging an externally extending ridge 166 on the cap, and screw threads 168 for engaging the screw threads 170 on the external surface of shell 130. Extending through the center of coil 135 across the right-hand end, as viewed in FIGURE 2, and along the external surface of the coil, are six U-shaped laminated metal members 172 of magnetic material forming effective paths for the magnetic circuit. These members are equally spaced around the magnet and the free ends thereof are adjacent the bottom of shell 130.

One of the principal features of the present invention is the construction of shell 130 which consists of a cup-shaped member having cylindrical side walls 180 and an initially perforated bottom plate 182. The holes 183 in the bottom are closed by inserts 184 forming an external ring in the bottom plate 182, and inserts 186 forming an internal ring in the bottom, the holes being preferably round and the inserts preferably cylindrical. These inserts are located to correspond to the inner and outer ends of U-shaped members 172 and are brazed or otherwise bonded in place in the bottom in fluid-tight relationship so that the final cup-shaped shell is completely impervious to liquids and gases throughout its entire side wall and bottom sections 180 and 182, respectively. The shell is formed of nonmagnetic material, preferably stainless steel, and the inserts 184 and 186 are formed of a metal, such as soft iron, having the property of effectively conducting a magnetic current. These inserts may be placed at various places in the bottom 182 of shell 130, the position preferably being such that the magnetic forces are transmitted effectively from the electromagnetic coil to armature 100. The cup 130 may be of various shapes and designs and may be constructed of different materials, and a number of different kinds of material may be used in the construction of a particular cup. For example, a stainless steel bottom containing inserts 184 and 186 may be connected to plastic side walls, or the electromagnet may be merely mounted unprotected on bottom 182, the bottom in this construction being secured in place at the end of section 12 by ring 16 in the same manner as the cup-shaped member 130 is secured thereto. When a conventional E-shaped core is used in the coil, the cup-shaped member may be rectangular with three inserts in the bottom plate positioned at the free ends of the core.

After the valve has been assembled in the manner shown in FIGURE 2, energization of solenoid 132 transmits a magnetic current through bottom 182 by inserts 184 and 186, which reacts on armature 100 and draws the armature firmly against bottom 182 in opposition to the force of spring 110. Movement of the armature to this position shifts the valve element so that land 62 is positioned in port 51, and land 64 is to the right of port 52, thereby connecting chambers 36 and 42 for the flow of fluid from inlet passage 38 to outlet passage 46. When the solenoid is deenergized, spring 86, which is of greater strength than spring 110, returns valve element 61 to the position shown in FIGURE 2 with land 64 closing port 52 and land 62 to the left of port 51, thereby connecting chambers 36 and 40 for flow of fluid from inlet passage 38 to outlet passage 44.

It is seen that the foregoing construction, including the bottom or plate 182 containing the inserts, completely seals the fluid passages of valve section 12 from the solenoid disposed in the cup-shaped member 130. This construction renders the solenoid completely safe for use in conjunction with inflammable and corrosive fluids. Leakage of fluid past sealing lands 66 and 68 into chambers 80 and 82 has little or no effect on the operation of the valve, since these pressures are balanced by the connection provided through passage 84. The fluid can not escape from either of these two end chambers, and, consequently, can not cause any serious effect on the operation of the valve.

The present solenoid construction, including the cup-shaped member with the inserts, may be utilized advantageously in many different types of devices and applications, the valve embodiment being described herein merely to illustrate one particular application. Further, while only one embodiment of the invention has been described in detail herein, various changes and modifications may be made to satisfy requirements without departing from the scope of the invention.

I claim:

1. A solenoid construction comprising a non-magnetic cup-shaped member having a bottom, an electromagnetic coil disposed in said cup-shaped member with one pole thereof adjacent the inside of said bottom, a plurality of sets of flat metal strips passing through the center of said coil and radially therefrom and along the external surface, said sets being spaced around the periphery of the coil and the greatest width of said strips extending circumferentially of the coil, means securing said coil and strips in said cup-shaped member, and a plurality of relatively small inserts of magnetic ferrous material in said cup bottom, one group of said inserts being annularly arranged near but spaced from the center of the bottom and extending therethrough, and another group of said inserts being annularly arranged near the periphery of the bottom and extending therethrough, the inserts of each of said groups corresponding in position to the position of metal strips of said coil.

2. A solenoid valve comprising a valve body, an element in said body controlling the flow of fluid through said valve, said body having a chamber at one end of said element, a substantially disc-shaped armature in said chamber connected to said element, a plate of nonmagnetic material secured to said body forming an impervious wall of said chamber, one side of said plate being positioned adjacent said armature, an electromagnetic coil having one pole thereof disposed on the opposite side of said plate, a plurality of sets of metal strips passing through the center of said coil and radially therefrom and along the external surface, said sets being spaced around the periphery of the coil, and a plurality of relatively small inserts of magnetic material in said plate, one group of said inserts being annularly arranged near but spaced from the center of the plate and extending therethrough, and another group of said inserts being annularly arranged near the periphery of the plate and extending therethrough, the inserts of each of said groups corresponding in position to the position of metal strips of said coil.

3. In a solenoid valve: a valve body, an element in said body controlling the flow of fluid through said valve, said body having a chamber at one end of said element, an armature in said chamber connected to said element, a cup-shaped member of nonmagnetic material secured to said body and having a bottom forming a wall of said chamber, the outside of said bottom being positioned adjacent said armature, an electromagnetic coil disposed in said cup-shaped member with one pole therof adjacent the inside of said bottom, means securing said coil in said cup-shaped member, and a plurality of relatively small inserts of magnetic material in said bottom, one group of said inserts being annularly arranged near but spaced from the center of the bottom and extending therethrough and another group of said inserts being annularly arranged near the periphery of the bottom and extending therethrough.

4. In a solenoid valve: a valve body, an element in said body controlling the flow of fluid through said valve, said body having a chamber at one end of said element, a substantially disc-shaped armature in said chamber axially aligned with and connected to said element, a cup-shaped member of nonmagnetic material secured to said body and having a bottom forming an impervious wall of said chamber, the outside of said bottom being positioned adjacent said armature, an electromagnetic coil disposed in said cup-shaped member with one pole thereof adjacent the inside of said bottom, sets of metal strips passing through the center of said coil and radially therefrom and along the external surface, said sets being spaced around the periphery of the coil, means securing said coil and strips in said cup-shaped member, and a plurality of relatively small inserts of magnetic material in said bottom, one group of said inserts being annularly arranged near the center of the bottom and extending therethrough and another group of said inserts being annularly arranged near the periphery of the bottom and extending therethrough.

5. A solenoid valve comprising a valve body having a fluid inlet passage and a fluid outlet passage, an element in said body controlling the flow of fluid from said inlet passage to said outlet passage, resilient means urging said element to its closed position, said body having a chamber at one end of said element, a stem connected to said element and extending into said chamber, a substantially disc-shaped armature in said chamber axially aligned with said element and connected to said stem, a cup-shaped member of non-magnetic material secured to said body and having a bottom forming an impervious wall of said chamber, the outside of said bottom being positioned adjacent said armature, an electromagnetic coil disposed in said cup-shaped member with one pole thereof adjacent the inside of said bottom, a plurality of sets of metal strips passing through the center of said coil and radially therefrom and along the external surface, said sets being spaced around the periphery of the coil, means securing said coil in said cup-shaped member, and a plurality of relatively small cylindrically-shaped inserts of magnetic material in said bottom, one group of said inserts being annularly arranged near but spaced from the center of the bottom and extending therethrough and another group of said inserts being annularly arranged near the periphery of the bottom and extending therethrough, the inserts of each of said groups corresponding in position to the position of metal strips of said coil.

6. A solenoid valve comprising a valve body having a fluid inlet passage and two fluid outlet passages, a spool valve element in said body controlling the flow of fluid from said inlet passage to said outlet passages, resilient means urging said element to one position, said body having a chamber at one end of said valve element, a stem connected to said element and extending into said chamber, a substantially disc-shaped armature in said chamber axially aligned with said valve element and connected to said stem, a cup-shaped member of nonmagnetic metal secured to said body and having a bottom forming an impervious wall of said chamber, the outside of said bottom being positioned adjacent said armature, an electromagnetic coil disposed in said cup-shaped member with one pole thereof adjacent the inside of said bottom, a plurality of sets of metal strips passing through the center of said coil and radially therefrom and along the external surface, said sets being spaced around the periphery of the coil, means securing said coil and strips in said cup-shaped member, and a plurality of relatively small cylindrically-shaped inserts of magnetic ferrous material in said bottom, one group of said inserts being annularly arranged near but spaced from the center of the bottom and extending therethrough and another group of said inserts being annularly arranged near the periphery of the bottom and extending therethrough, the inserts of each of said groups corresponding in position to the position of metal strips of said coil.

7. In a solenoid construction, an electro-magnetic coil having a plurality of sets of metal strips passing through the center and radially therefrom and along the external surface forming a series of U-shaped elements, a plate of nonmagnetic material adjacent the ends of said U-shaped elements, and a plurality of relatively small inserts of magnetic material in said plate, one group of said inserts being annularly arranged near but spaced from the center of the plate and extending therethrough, and another group of said inserts being annularly arranged near the periphery of the plate and extending therethrough, the inserts of each of said groups corresponding in position to the position of the metal strips of said coil.

8. In a solenoid construction, a coil, a plate positioned adjacent one end of the coil and composed of nonmagnetic material, a plurality of small inserts of magnetic material in said plate, one group of inserts being annularly arranged near but spaced from the center of said plate and extending therethrough, and another group of said inserts being annularly arranged near the periphery of the plate and extending therethrough.

References Cited in the file of this patent

UNITED STATES PATENTS

| | | |
|---|---|---|
| 2,209,418 | Overbeke | July 30, 1940 |
| 2,952,802 | Michelson | Sept. 13, 1960 |

FOREIGN PATENTS

| | | |
|---|---|---|
| 1,249,931 | France | Nov. 28, 1960 |